United States Patent
Sheynblat et al.

[11] Patent Number: 6,121,928
[45] Date of Patent: Sep. 19, 2000

[54] NETWORK OF GROUND TRANSCEIVERS

[75] Inventors: Leonid Sheynblat, Belmont, Calif.; Harold L. Longaker, Houston, Tex.

[73] Assignee: Trimble Navigation Limited, Sunnyvale, Calif.

[21] Appl. No.: 09/135,952

[22] Filed: Aug. 18, 1998

[51] Int. Cl.[7] .................. G01S 3/02; G01S 5/02; H04B 7/185; H04Q 7/20
[52] U.S. Cl. .................. 342/463; 342/357.03; 342/358; 342/450; 455/422; 455/456
[58] Field of Search ............... 342/357.06, 357.03, 342/357.08, 357.16, 453, 457, 450, 463, 358; 455/404, 422, 456, 457

[56] References Cited

U.S. PATENT DOCUMENTS 5,510,797 4/1996 Abraham et al. .................. 342/352
5,646,630 7/1997 Sheynblat et al. .................. 342/463

Primary Examiner—Thomas H. Tarcza
Assistant Examiner—Fred H Mull
Attorney, Agent, or Firm—Blakely, Sokoloff, Taylor & Zafman LLP

[57] ABSTRACT

The present invention involves a system and method for determining a position of an object. The system comprises at least one ground transmitter configured to generate ground transmitter position signals comprising position information. The at least one ground transmitter has a known position. The system also comprises at least one ground transceiver having a known position and configured to receive the ground transmitter position signals and transmit ground transceiver position signals that are synchronized to the clock of the at least one ground transmitter. The object is configured to receive the ground transmitter position signals, the ground transceiver position signals and calculate the position of the object based on the received signals and the known positions of the at least one ground transmitter and the at least one ground transceiver.

24 Claims, 5 Drawing Sheets

NETWORK OF GROUND TRANSCEIVERS

BACKGROUND OF THE INVENTION

1. Field of the Invention

The present invention relates in general to radiodetermination systems and in particular, to an apparatus and method for providing radiodetermination using a system of networked ground transceivers located in known positions that, alone or with a plurality of Satellite Positioning System satellites, allows a user to precisely determine its position location, its timing, and/or its velocity.

2. Prior Art

The art of surveying involves the determination of an unknown position from angular and distance measurements taken from one or more reference positions. The Global Positioning System (GPS) is a widely used satellite-based navigational system consisting of a network of satellites broadcasting pseudo-random noise (PRN) codes modulated on an L-band carrier (L1, L2). A GPS receiver uses measurements of the PRN code-phase and carrier-phase from four or more satellites to solve for the three-dimensional position of the receiver and to calibrate its internal time reference. The GPS receiver determines velocity from measurements of the carrier phase and doppler shifts. The accuracy of a location as provided by the GPS approach is limited by the errors on the GPS signals and the geometry established by the positions of the satellites relative to the user.

For instance, there are areas of limited visibility of the sky where the user can observe and receive the satellite signals from only a limited number of Satellite Positioning System (SATPS) satellites. Thus, in such an area, it is impossible for the user to precisely solve for the three-dimensional position of its receiver, to calibrate its internal time reference, or to determine its velocity.

Moreover, there are instances where the user does not have accessibility to any of the satellites or accessibility to equipment for observing and receiving the satellite signals from the SAPTS satellites. In such instances, the user must rely on other navigational systems to precisely solve for its three-dimensional position, to calibrate its internal time reference or to determine its velocity.

Accordingly, there is a need in the technology for an apparatus and method of providing radiodetermination using a system of networked ground transmitters located in well-known positions that, alone, or together with at least one visible SATPS satellite, allows the user to precisely determine its position location, its timing, and/or its velocity.

BRIEF SUMMARY OF THE INVENTION

The present invention involves a system and method for determining a position of an object. The system comprises at least one ground transmitter configured to generate ground transmitter position signals comprising position information. The at least one ground transmitter has a known position. The system also comprises at least one ground transceiver having a known position and configured to receive the ground transmitter position signals and transmit ground transceiver position signals that are synchronized to the clock of the at least one ground transmitter. The object is configured to receive the ground transmitter position signals, the ground transceiver position signals and calculate the position of the object based on the received signals and the known positions of the at least one ground transmitter and the at least one ground transceiver.

DETAILED DESCRIPTION OF THE INVENTION

I. System A

Figure 1:
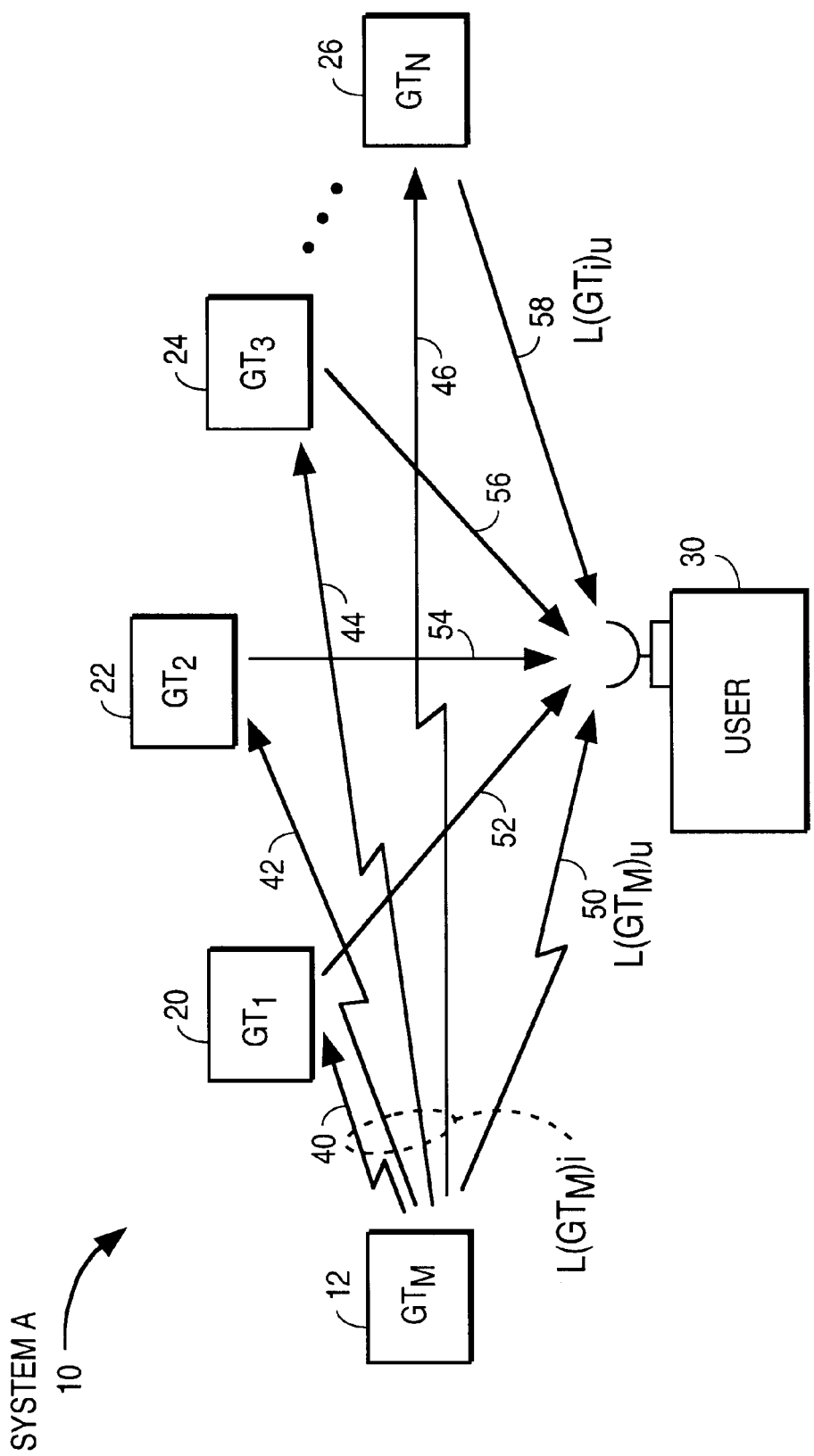
FIG. 1 illustrates one embodiment of a radiodetermination system (A) of the present invention, comprising at least one ground transmitter ($GT_M$), and a plurality of ground transceivers ($GT_i$).

FIG. 1 illustrates a System A (10) comprising a master ground transmitter $GT_M$ 12, N-number of ground transceivers ($GT_i$, where i=1, . . . , n) (20, 22, 24, 26), a user that has a receiver (collectively referred to as the user 30 ), an N number of communication links ($L(GT_M)i$, where i=1, . . . , N) (40, 42, 44, 46) between the $GT_M$ 12 and each transceiver $GT_i$, a communication link $L(GT_M)u$ (50) between $GT_M$ 12 and the user 30, and N number of communication links ($L(GT_i)u$, where i=1, . . . , N) (52, 54, 56, 58) between each $GT_i$ and the user (30).

In System A (10), the user (30) utilizes data provided by the ground transmitter $GT_M$(12) and the ground transceivers $GT_i$ to obtain positional information. It is assumed that the master ground transmitter $GT_M$(12) and each ground transceiver $GT_i$ precisely knows its location. The master ground transmitter $GT_M$(12) and each ground transceiver $GT_i$ are surveyed in order to obtain these precise locations. The master ground transmitter $GT_M$(12) provides a master clock signal to which the ground transceivers $GT_i$ are slaved. As a result, the clock bias $CB_{GT_i}$ of each ground transceiver $GT_i$ is identical to the clock bias of the clock bias $CB^M$ of $GT_M$(12) or is off by a known delay. It is apparent to one of ordinary skill in the art that the ground transmitter $GT_M$(12) may be implemented using a transceiver, and that the ground transceivers $GT_i$ can include any device capable of generating and receiving signals for providing ranging, timing, and/or velocity information at the user's (30) location.

The master ground transmitter $GT_M$(12) uses a communication link $L(GT_M)i$ (40, 42, 44, 46) for transmitting the $L(GT_M)i$ signals to each $GT_i$ (20, 22, 24, 26). The master ground transmitter $GT_M$ 12 further uses a communication link $L(GT_M)u$ (50) for transmitting the $L(GT_M)u$ signals to the user 30. Similarly, each ground transceiver $GT_i$ uses a communication link $L(GT_i)u$ (52, 54, 56, 58) for transmitting the $L(GT_i)u$ signals to the user (30). The communication links $L(GT_M)i$, $L(GT_M)u$, and/or $L(GT_i)u$ can be implemented using a variety of different embodiments.

In general, any one or all of the communication links $L(GT_M)i$, $L(GT_M)u$, and/or $L(GT_i)u$ can employ a radio wave frequency band, an infrared frequency band, or a microwave frequency band. In one embodiment, any one or all of the communication links $L(GT_M)i$, $L(GT_M)u$, and/or $L(GT_i)u$ can include the ISM (industrial scientific medical) unlicensed operation band, including 900 MHz, 2.4 GHz, or 5.8 GHz bands, wherein the user can own both ends of the ISM communication system. The ISM technologies are manufactured by Trimble Navigation Limited, Sunnyvale, Calif., Metricom, Los Gatos, Calif., and by Utilicom, Santa Barbara, Calif.

In another embodiment, any one or all of the communication links $L(GT_M)i$, $L(GT_M)u$, and/or $L(GT_i)u$ can employ a 1.8 GHz band that supports the personal communications services (PCS). The PCS uses the international standard DCS-1800 and PCS-1900. In yet one more embodiment, any one of the communication links $L(GT_M)i$, $L(GT_M)u$, and/or $L(GT_i)u$ can include a real time circuit switched communication link. For instance, any one of the communication links $L(GT_M)i$, $L(GT_M)u$, and/or $L(GT_i)u$ employing a real time circuit switched communication link can include the Iridium satellite system produced by Motorola, Schaumburg, Ill. In one additional embodiment, any one of the communication links $L(GT_M)i$, $L(GT_M)u$, and/or $L(GT_i)u$ can employ a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in the 20–30 GHz range are manufactured by Cellular Communications located in Redmond, Wash., and the LEOS systems in the 1.6–2.5 GHz range are produced by Loral/Qualcomm located in San Diego, Calif.

Any one of the communication links $L(GT_M)i$, $L(GT_M)u$, and/or $L(GT_i)u$ can also include a cellular telephone communication means, a paging signal receiving means, wireless messaging services, wireless application services, a wireless WAN/LAN station, or an Earth-satellite-Earth communication module that uses at least one satellite to relay a radio wave signal.

In another embodiment, any one of the communication links $L(GT_M)i$, $L(GT_M)u$, and/or $L(GT_i)u$ includes the cellular telephone communication means that can include an Advanced Mobile Phone System (AMPS) with a modem. The modem can comprise a DSP (digital signal processor) modem in 800 MHz range, or a cellular digital packet data (CDPD) modem in 800 MHz range. The cellular digital communication means includes a means of modulation of digital data over a radio link using a time division multiple access (TDMA) system employing format IS-54, a code division multiple access (CDMA) system employing format IS-95, or a frequency division multiple access (FDMA). The TDMA system used in Europe is called Groupe Special Mobile (GSM) in French.

Figure 2:
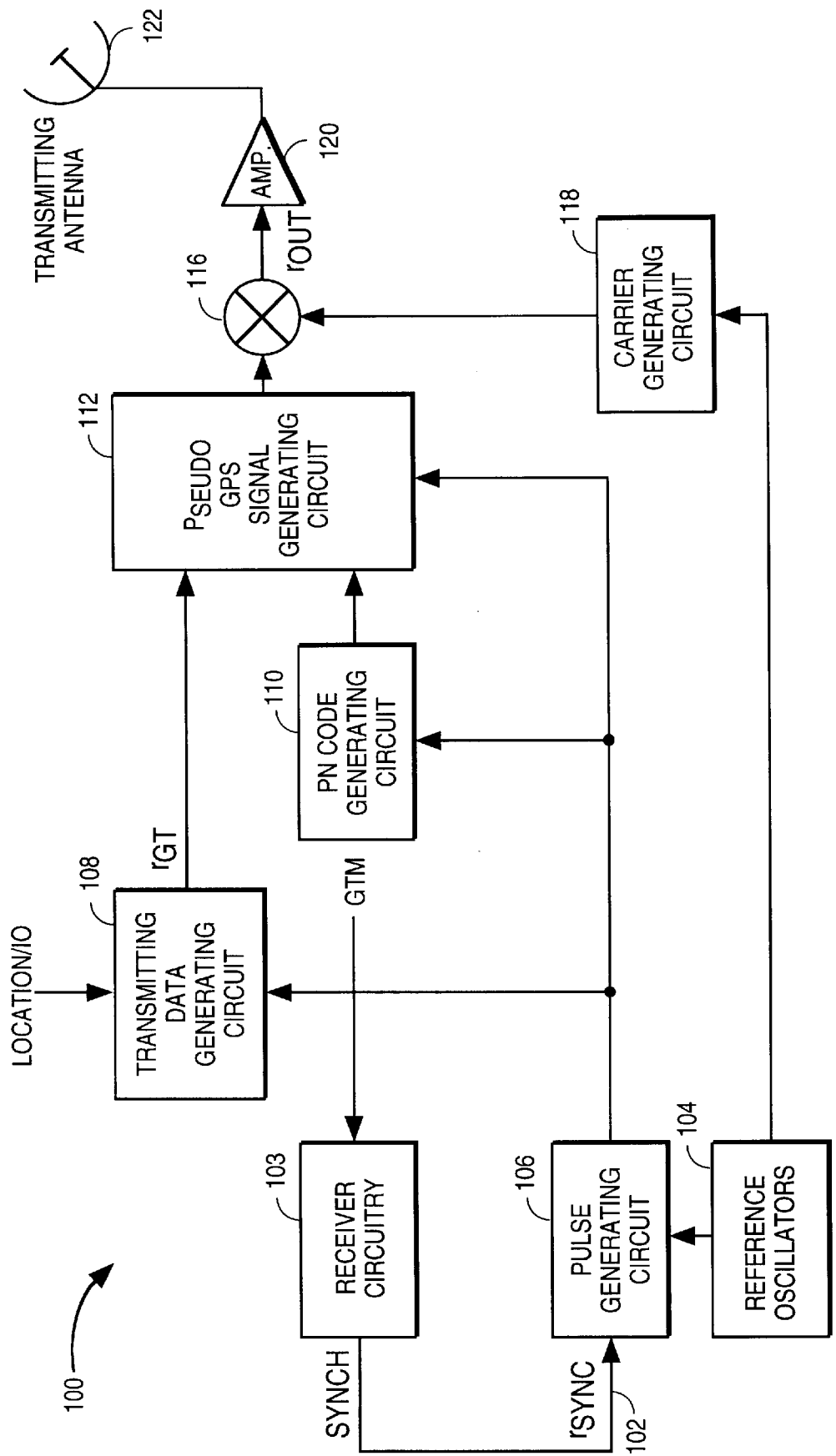
FIG. 2 shows a ground transceiver (GT) comprising a pseudolite.

In the preferred embodiment, each ground transceiver $GT_i$ can be implemented using a pseudolite (100) depicted in FIG. 2. As shown in FIG. 2, the pseudolite $GT_i$ generates and transmits pseudo-GPS signals. The pseudolite $GT_i$ may also be configured to receive psuedo-GPS signals. In the simplest approach, ground transceiver/pseudolite $GT_i$ transmits on L-band (i.e., the GT -band is the GPS signal band, for instance L2 frequency) and modulates that signal with its own unique PRN code. This code can provide anti-jamming capability and also serve as an identification of a particular (i) $GT_i$ as a source of the signal. The $L(GT_i)u$ signal can be modulated with the data that allows a user to learn the precise coordinates of the $GT_i$ location. The precise location can be omitted from the $GT_i$ output data if the user is capable of looking up that information based on the $GT_i$ ($ID_i$) number (PRN code can be used as an ($ID_i$) number). The master ground transmitter $GTM(^{12})$ may also be implemented using the pseudolite (100).

In particular, a synchronization signal $r_{sync}$ (102) provided by $GT_M$(12) and received by receiver circuitry (103) is first provided to a pulse generating circuit (106) in the pseudolite (100). The pulse generating circuit (106) in turn provides a synchronized pulse to a number of other circuits within the pseudolite (100), including a Transmitting Data Generating circuit (108), a PN Code Generating circuit (110) and a Pseudo GPS signal Generating circuit (112). A reference oscillator (104) provides reference timing signal for the pulse generating circuit (106). The Transmitting Data Generating circuit (108) generates a signal $r_{GT}$ containing information such as location and ID is intended for inter radio transmission between each ground transceiver $GT_i$ and the user (30). The signal $r_{GT}$ is provided to the Pseudo GPS Signal Generating circuit (112), which generates a Pseudo GPS signal, while the PN Code Generating circuit (110) modulates the Pseudo GPS Signal with its own unique PRN code. The resulting signal containing both the PRN code and the $r_{GT}$ information is mixed with a carrier signal provided via Carrier Generating circuit (118) to provide an output signal r which is amplified via amplifier (120) and then transmitted via antenna (122).

I.A. Minimum Structure of System A

1. General

The following discussion is focused on the determination of the minimum structure including the minimum number N of ground transceivers $GT_i$ necessary to solve for the three-dimensional position of the user (30) and to calibrate its internal time reference. A similar discussion can be focused on the measurements of the range-rate and Doppler necessary to determine velocity of the user. The following equations to determine the minimum structure will be written only for pseudo-ranges. A similar system of equations can be written for the carrier phase measurements. This carrier phase system of equations yields the same result for the minimum structure if the carrier phase ambiguities can be resolved without additional measurements.

The pseudo-range signal $PR_{USER}{}^M$ received by the user (30) (FIG. 1) from the master ground transmitter GTM 12 can be expressed as follows:

$$PR_{USER}{}^M = R_{USER}{}^M + CB^M + CB_{USER} + M_{USER}{}^M + \eta_{USERM} \quad (1)$$

where $$R_{USER}^M = \sqrt{(X_{USER} - X_{GTM})^2 + (Y_{USER} - Y_{GTM})^2 + (Z_{USER} - Z_{GTM})^2} \quad (2)$$

$R_{USER}{}^M$ is the "nominal" true range between user (30) and the master ground transmitter $GT_M$(12), wherein $X_{USER}$, $Y_{USER}$, and $Z_{USER}$ are the unknown user's coordinates, and $X_{GTM}$, $Y_{GTM}$, and $Z_{GTM}$ are the known coordinates of each transceiver $GT_j$.

$CB^M$ is the clock error of the master ground transmitter $GT_M$(12);

$CB_{USER}$ is the clock error of the user's receiver (30);

$M_{USER}{}^M$ is the multipath error in the user's receiver (30); and $\eta_{USER}{}^M$ the receiver noise error in user's receiver (30).

The pseudo-range signal $PR_{USER}(GT_j)$ received by the user 30 (FIG. 1) from each of a j-number of ground transceivers GTj can be expressed as:

$$PR_{USER}(GT_j) = \qquad (3)$$
$$R_{USER}(GT_j) + CB^{GT_j} + CB_{USER} + \left(M_{USER}^{GT_j}\right) + \left(\eta_{USER}^{GT_j}\right) \text{ where}$$

$$R_{USER}(GT_j) = \qquad (4)$$
$$\sqrt{\{(X_{USER} - X_{GT_j})^2 + (Y_{USER} - Y_{GT_j})^2 + (Z_{USER} - Z_{GT_j})^2\}}$$

represents the "nominal" or true range from the user (30) to the transceiver $GT_j$, wherein $X_{USER}$, $Y_{USER}$ and $Z_{USER}$ are the unknown user's coordinates, and $X_{GT_j}$, $Y_{GT_j}$, and $Z_{GT_j}$ are the known coordinates of each transceiver $GT_j$;

$CB_{GT_j}$ being slaved to $GT_M$, represents a known clock bias associated with the transceiver $GT_j$'s clock;

$CB_{USER}$ is an unknown clock bias associated with the user's imprecise clock;

$M_{USER}^{GT_j}$ is the multipath error in the user's receiver (30); and $\eta_{USER}^{GT_j}$ is the receiver noise in the user's receiver (30).

Eqns. (3) and (4) can be written for each of the N-number of ground transceivers $GT_j$. In the preferred embodiment, the user's clock bias $CB_{USER}$ is an unknown variable because the user's clock is imprecise. If the ground transceivers $GT_j$, which are slaved to $GT_M$(12) are coherently synchronized to the master ground transmitter $GT_M$'s clock, i.e. $CB^{GT_j}$ is equal to $CB^M$, then there will be only four unknowns: $X_{USER}$, $Y_{USER}$, $Z_{USER}$ and the quantity $\{(CB^M + CB^{USER})\}$. To solve for these four unknowns, a minimum of one master ground transmitter, $GT_M$ and three ground transceivers $GT_i$ are required in System A.

Thus, Eqns. (1)–(4) allow one to determine the minimum structure of the system (A), which is the combined number of ground transceivers $GT_i$ needed along with the master ground transmitter $GT_M$(12), for the differential determination of the position of the user.

Details of such a minimum structure is provided below.

2. Radiolocation Based on 1 Master Ground Transmitter $GT_M$ and 3 Ground Transceiver $GT_i$ that are slaved to $GT_M$ If the ground transceivers $GT_i$ are not perfectly synchronized to master ground transmitter $GT_M$ clock, i.e. $CB_i$ of Eqn. (2) is not equal to $CB^M$, then:

$$CB^{GT_j} = CB^M + LB^{GT_j}$$

where $LB^{GT_j}$ is the line bias which is any unaccountable hardware delays, such as front end delays.

The pseudo-range signal received by each of the ground transceivers $GT_j$ from the master ground transmitter $GT_M$, $PR^{M,GT_j}$, can be expressed as:

$$PR^{M,GT_j} = R^{M,GT_j} + CB^M + (CB^M + LB^{GT_j}) + M^{M,GT_j} + \eta^{M,GT_j} \qquad (5)$$

where:

$PR^{M,GT_j}$ is a measured pseudo range, affected by clock errors, multipath and system noise.

Since, the true disclosure or range between the master ground transmitter $GT_M$ and a ground transceiver $GT_j$ can be computed as:

$$R^{M,GT_j} = \sqrt{(X_M - X_{GT_j})^2 + (Y_M - Y_{GT_j})^2 + (Z_M - Z_{GT_j})^2}$$

a pseudo-range residual can be computed as follows:

$$PR^{M,GT}-R^{M,GT_j} = 2CB^M + LB^{GT_j} + M^{M,GT_j} + \eta^{M,GT_j} \qquad (6)$$

where:

$M^{M,GT_j}$ can be considered a constant, since there is no relative motion between the master ground transmitter $GT_M$ and each ground transceivers $GT_j$.

Therefore, $M^{M,GT_j}$ can be absorbed into the line bias error $LB^{GT_j}$, and we obtain;

$$PR^{M,GT_j}-R^{M,GT_j} = 2CB^M + LB^{GT_j} + \eta^{M,GT_j}$$

$$PR^{M,GT_j}-R^{M,GT_j} = CB^M + CB^{GT_j} + \eta^{M,GT_j}$$

By driving the value $(PR^{M,GT_j}-R^{M,GT_j})$ to zero, the following expression is obtained $$CB^M = (CB^{GT_j} + \eta^{M,GT_j}) \qquad (7)$$

Eqn. (7) indicates that the clock at the ground transceivers $GT_j$ can be synchronized or set to the clock of master ground transmitter $GT_M$ with an offset equal to the line bias $LB^{GT_j}$ while maintaining the same value of the receiver noise $(\eta^{M,GT_j})$ for the ground transceiver $GT_j$.

3. Radiolocation Based on Multiple Master Ground Transmitters $GT_M$

Figure 3:
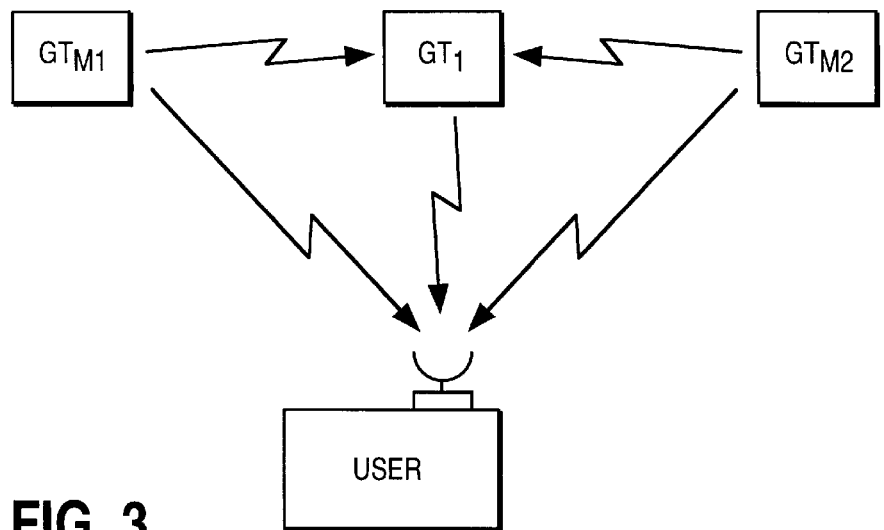
FIG. 3 illustrates a second embodiment of the radiodetermination system (A) of the present invention, comprising at least two ground transmitters ($GT_M$) and at least one ground transceiver ($GT_i$).

The line bias $LB^{GT_j}$ can be solved by either continuous calibration, where a reference signal is passed through the transceivers front end and the delay measured, or by the inclusion of another master ground transmitter $GT_{M2}$. In the following discussion, $GT_M$ of FIG. 1 will be represented by $GT_{M1}$ and a second master ground transmitter $GT_{M2}$ is introduced, as shown in FIG. 3.

The pseudo-range signal $PR_{USER}^{GTM1}$, received by the user (30) from $GT_{M1}$ is $$PR_{USER}^{GTM1} = R_{USER}^{GTM1} + CB^{GTM1} + CB_{USER} + M_{USER}^{GTM1} + \eta_{USER}^{GTM1} \qquad (8)$$

The pseudo-range signal $PR_{USER}^{GTM2}$ received by the user (30) from $GT_{M2}$ is:

$$PR_{USER}^{GTM2} = R_{USER}^{GTM2} + CB^{GTM2} + CB_{USER} + M_{USER}^{GTM2} + \eta_{USER}^{GTM2} \qquad (9)$$

The pseudo-range signal $PR_{USER}^{GT1}$, received by the user (30) from GT1 is:

$$PR_{USER}^{GT1} = R_{USER}^{GT1} + CB^{GT1} + CB_{USER} + M_{USER}^{GT1} + \eta_{USER}^{GT1} \qquad (10)$$

$PR_{USER}^{GT1,GTM1}$ is the pseudo-range measurement made by the user's (30) receiver based on the rebroadcast of the $GT_{M1}$ signal by $GT_1$, and can be expressed as:

$$PR_{USER}^{GT1,GTM1} = R_{USER}^{GT1} + (CB^{GTM1} + LB^{GT1}) + \qquad (11)$$
$$CB_{USER} + M_{USER}^{GT1} + \eta_{USER}^{GTM1,GT1}$$

since $$CB^{GT_j} = CB^{GTM_j} + LB^{GT_j}$$

$PR_{USER}^{GT1,GTM2}$ is the pseudo-range measurement made by the user's (30) receiver based on the rebroadcast of the $GT_{M2}$ signal by $GT_1$.

$$PR_{USER}^{GT1,GTM2} = R_{USER}^{GT1} + (CB^{GTM2} + LB^{GT1}) + \quad (12)$$

$$CB_{USER} + M_{USER}^{GT1} + \eta_{USER}^{GTM2,GT1}$$

Two pseudo ranges $PR_{USER}^{GTM1,GT1}$ and $PR_{USER}^{GTM2,GT1}$ can be measured independently even though they are generated by the same ground transmitter, $GT_1$, as shown in FIG. 3, since each signal component can be identified by any of the multiple access techniques (such as CDMA, TDMA, etc.).

A single difference of Eqns. (11) and (12) can be expressed as:

$$PR_{USER}^{GT1,GTM1} - PR_{USER}^{GT1,GTM2} = (CB^{GTM1} - CB^{GTM2}) + \quad (13)$$

$$(\eta_{USER}^{GT1,GTM1} - \eta_{USER}^{GT1,GTM2})$$

Observe in Eqn. 13 that the clock errors ($CB_{USER}$) associated with $GT_1$ drop out.

$$PR_{USER}^{GTM1} - PR_{USER}^{GTM2} = R_{USER}^{GTM1} - R_{USER}^{GTM2} + \quad (14)$$

$$(CB^{GTM1} - CB^{GTM2}) + (\eta_{USER}^{GTM1} - \eta_{USER}^{GTM2})$$

Figure 4:
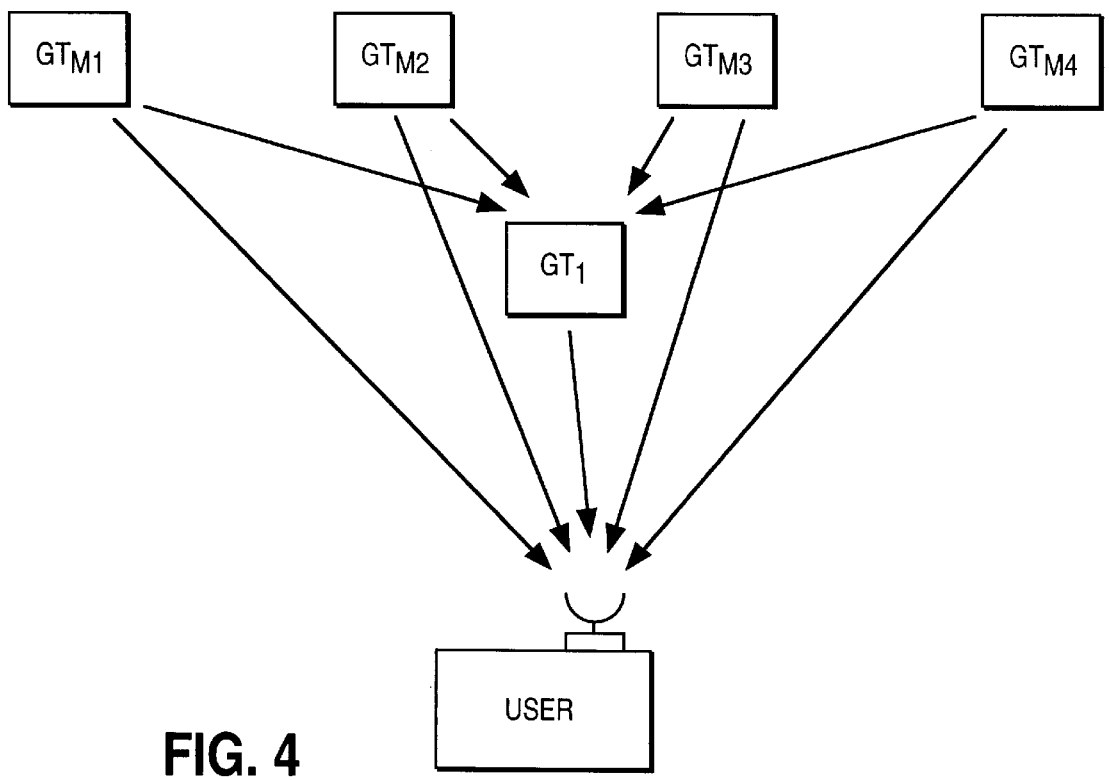
FIG. 4 depicts a third embodiment of the radiodetermination system (A) of the present invention comprising a plurality of ground transmitters ($GT_M$) and at least one ground transceiver ($GT_i$).

In this manner, a radio location system based on 4 master ground transmitters $GT_M$, and a single ground transceiver $GT_1$ slaved to the master ground transmitters $GT_M$ may be provided, as shown in FIG. 4, since there is a total of four unknowns: $X_{USER}$, $Y_{USER}$, $Z_{USER}$ and $(CB^{GTM1}-CB^{GTM2})$ (clock unknown).

4. Satellite-Based Networked Transceiver System

Figure 5:
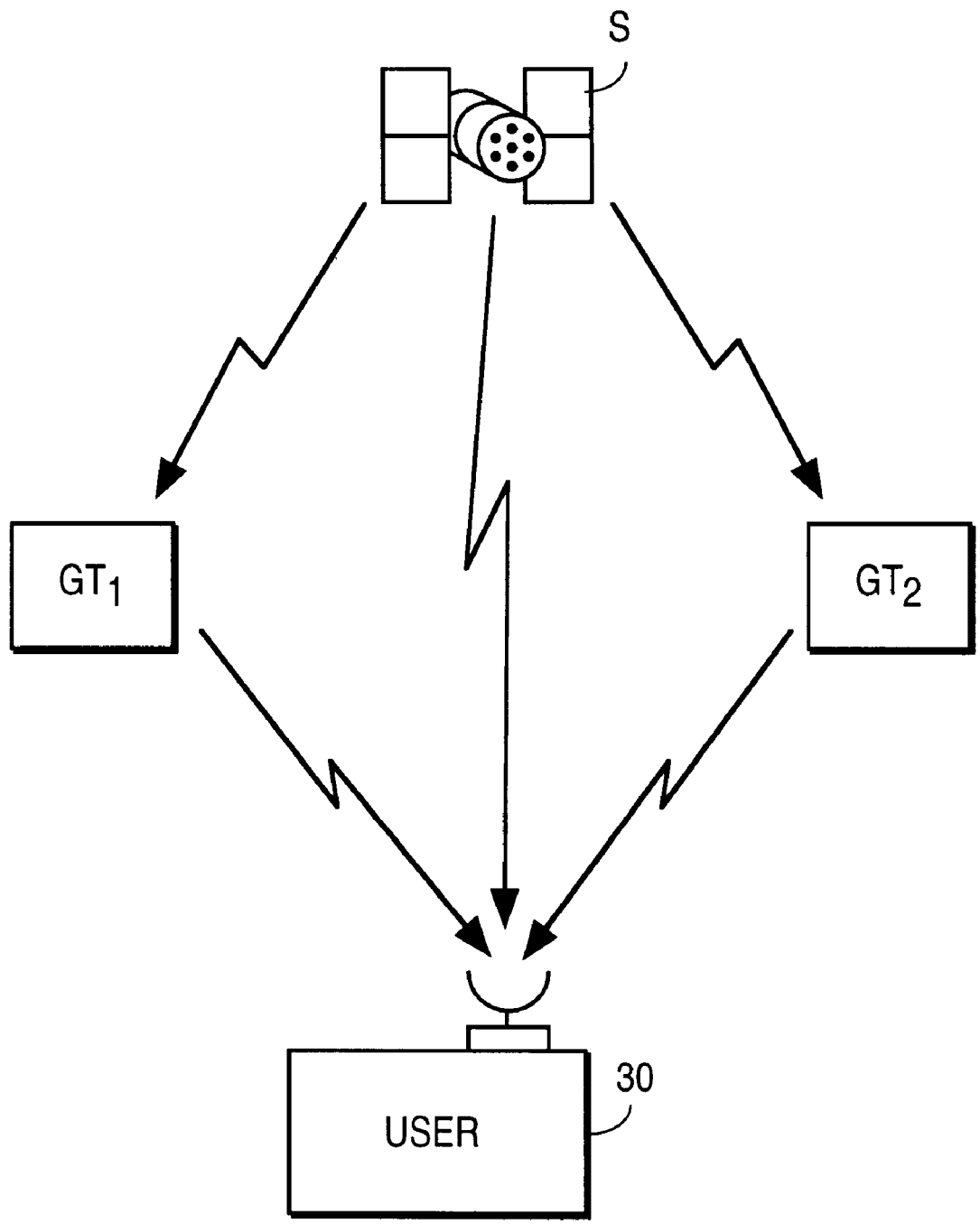
FIG. 5 depicts a fourth embodiment of the radiodetermination system (A) of the present invention comprising a plurality of ground transceivers ($GT_i$) and at least one satellite.

The radiolocation system comprising at least two ground transceivers as shown in FIG. 5 will now be discussed. In this embodiment, at least one satellite is relied upon by the ground transceivers; however, the user need not track the satellite signals.

The pseudo-ranges $PR_{USER}^S$ from the Satellite S to the user 30; $PR_{GTi}^S$ from the Satellite S to ground transceiver GT1; and $PR_{GT2}^S$ from the Satellite S to the ground transceivers GT2 can be expressed as follows:

$$PR_{USER}^S = R_{USER}^S + CB^S + CB_{USER} + M_{USER}^S + \eta_{USER}^S \quad (15)$$

$$PR_{GT1}^S = R_{USER}^S + CB^S + CB_{GT1} + M_{GT1}^S + \eta_{GT1}^S \quad (16)$$

$$PR_{GT2}^S = R_{GT2}^S + CB^S + CB_{GT2} + M_{GT2}^S + \eta_{GT2}^S \quad (17)$$

The pseudo-ranges from GT1 and GT2 to the user may be expressed as:

$$PR_{USER}^{GT1} = R_{USER}^{GT1} + CB^{GT1} + CB_{USER} + M_{USER}^{GT1} + \eta_{USER}^{GT1} \quad (18)$$

$$PR_{USER}^{GT2} = R_{USER}^{GT2} + CB^{GT2} + CB_{USER} + M_{USER}^{GT2} + \eta_{USER}^{GT2} \quad (19)$$

where:

$R_{USER}^S$ is the "nominal" or the range between the user (30) and the satellite S;

$R_{GT1}^S$ is the "nominal" or true range between GT1 and the satellite S;

$R_{GT2}^S$ is the "nominal" or true range between GT2 and the satellite S;

$CB_S$, $CB_{GT1}$ and $CB_{GT2}$ are the clock errors of the satellite, GT1 and GT2, respectively;

$M_{USER}^S$, $M_{GT1}^S$, $M_{GT2}^S$, $M_{USER}^{GT1}$ and $M_{USER}^{GT2}$ are the multipath errors in the user's receiver (vis-a-vis signals from S), GT1's receiver, GT2's receiver, the user's receiver (vis-a-vis signal from GT1), the user's receiver (vis-a-vis signal from GT2) respectively; and $\eta_{USERS}$, $\eta_{GT1}^S$, $\eta_{GT2}^S$, $\eta_{USER}^{GT1}$, and $\eta_{USER}^{GT2}$ are the respective noise errors between: the satellite and the user, the satellite and GT1, the satellite and GT2, GT1 and the user, and GT2 and the user.

Thus, a single difference in pseudo-range between the user and GT1 and GT2 may be expressed as:

$$SD_{USER}^{GT1,GT2} = PR_{USER}^{GT1} - PR_{USER}^{GT2} \quad (20)$$

$$= (R_{USER}^{GT1} - R_{USER}^{GT2}) + (CB^{GT1} - CB^{GT2}) +$$

$$M_{USER}^{GT1} - M_{USER}^{GT2} + \eta_{USER}^{GT1} - \eta_{USER}^{GT2}$$

A single difference between the satellite and GT1 and GT2 may be expressed as:

$$SD_{GT1,GT2}^S = PR_{GT1}^S - PR_{GT2}^S \quad (21)$$

$$= (R_{GT1}^S - R_{GT2}^S) + (CB^{GT1} - CB^{GT2}) +$$

$$M_{GT1}^S - M_{GT2}^S + \eta_{GT1}^S + \eta_{GT2}^S$$

Single-differenced Eqn. (20) contains the unknown quantity ($R_{USER}^{GT1}-R_{USER}^{GT2}$) which is based on the location of user (30); this location includes 3 unknowns in spatial domain.

($CB_{GT1}-CB_{GT2}$) is a differenced clock bias between $GT_1$ and $GT_2$ which is a single unknown value in the temporal domain. If $CB_{GT1}=CB_{GT2}$, then the quantity ($CB_{GT1}-CB_{GT2}$) drops out from Eqn. (23).

Observe that in Eqn. (21), the variable $PR_{USER}^S$ is not used.

Therefore, the user (30) does not need to track satellite.

II. System B

Figure 6:
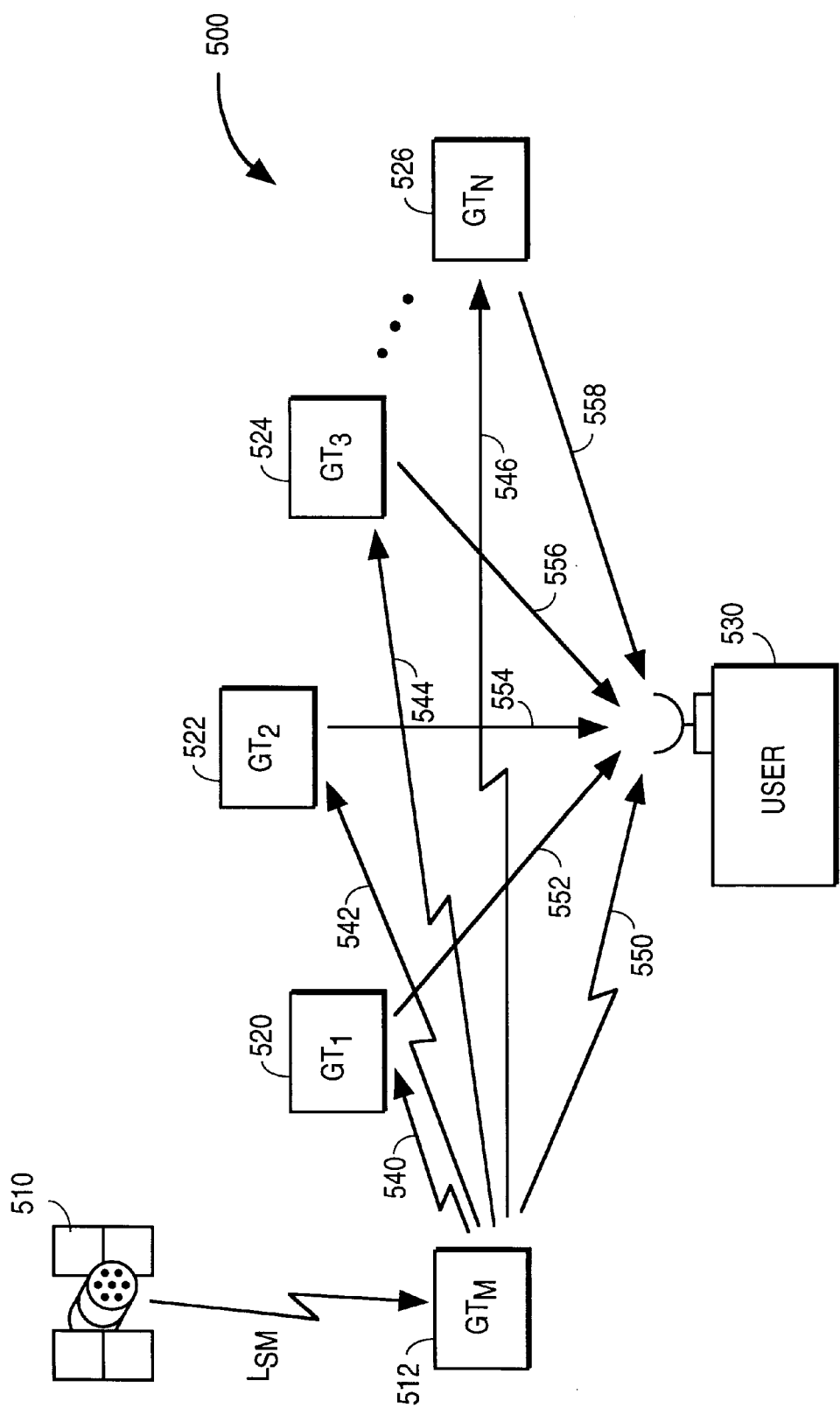
FIG. 6 illustrates an alternative embodiment (System B) of the radiodetermination system of the present invention, comprising at least one satellite, at least one master ground transmitter ($GT_M$), and a plurality of ground transceivers ($GT_i$).

FIG. 6 illustrates a system B (500), a master ground transmitter GTM (512), an N-number of ground transceivers ($GT_i$, where i=1, . . . , N) (520, 522, 524, 526), a user that has a receiver (collectively referred to as the user 530), an N number of communication links ($L(GT_M)i$, where i=1, . . . , N) (540, 542, 544, 546) between the GTM 112 and each transceiver $GT_i$, a communication link $L(GT_M)u$ (550) between GTM 512 and the user 530, and an N number of communication links ($L(GT_i)j$, where j=1, . . . , N) (552, 554, 556, 558) between each $GT_i$ and the user (530).

As with the user (30) in System A, the user (530) has limited visibility of the sky. The satellite SM (510) provides a satellite clock signal which is received by the ground transmitter GTM (512). In particular, System B utilizes data provided by the satellite SM (510), the ground transmitter $GT_M$ (512) and the ground transceivers $GT_i$ to obtain positional information. It is assumed that the master ground transmitter GTM 512 and each ground transceiver $GT_i$ precisely knows their respective position locations. The master ground transmitter $GT_M$ (512) and each ground transceiver $GT_i$ are surveyed in order to obtain these precise locations. An initialization signal that is supplied by the satellite $S_M$ (510) provides the necessary location information to the ground transmitter $GT_M$ and each ground transceiver $GT_i$. The satellite $S_M$ (510) also provides a clock signal to master ground transmitter $GT_M$ 512 which in turn provides a master clock signal to which the ground transceivers $GT_i$ are slaved. As a result, the clock bias $CB^{GTi}$ of each ground transceiver $GT_i$ is identical to the clock bias $CB^{GTM}$ of the master ground transmitter $GT_M$ (512). It is apparent to one of ordinary skill in the art that the ground transmitter $GT_M$ (512) may be implemented using a transceiver, and that the ground transceivers $GT_i$ can include any device capable of generating and receiving signals for providing ranging, timing, and velocity information at the user's location. In the disclosed embodiment each of the ground transceivers ($GT_i$) includes a transmitter and a receiver.

In one embodiment, the satellite $S_M$ (510) is part of the GPS, that is, a system of satellites that transmit information from which an observer's present location, velocity, and/or the time of observation can be determined with observer's receivers located on the Earth's surface or adjacent to the Earth's surface. In another embodiment, the satellite $S_M$ (510) may be implemented as a satellite that is part of the Global Orbiting Navigational Satellite System (GLONASS), which can operate as an alternative or an additional GPS system.

The Global Positioning System (GPS) is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° in longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and radio access to four or more such satellites can be used to determine an observer's position anywhere on the Earth's surface, 24 hours per day. Each satellite carries a satellite clock including a cesium or rubidium atomic clock to provide timing information for the signals transmitted by the satellite. Each satellite clock includes a known clock bias CBSM and a known clock drift CDSM, because clock corrections are provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=154$ $f0$ and $f2=120$ $f0$ of a base frequency $f0=10.23$ MHz. The L1 signal from each satellite is a binary phase shift key (BPSK) modulated by two pseudo-random noise (PRN) codes in phase quadrature, designated as the C/A-code and P(Y)-code. The L2 signal from each satellite is presently BPSK modulated by only the P(Y)-code. The nature of these PRN codes is described below. One motivation for use of two carrier signals L1 and L2 is to allow partial compensation for propagation delay of such a signal through the ionosphere, wherein delay varies approximately as the inverse square of signal frequency f (delay~$f^2$). This phenomenon is discussed by MacDoran in U.S. Pat. No. 4,463,357, which discussion is incorporated by reference herein.

A signal transmitted by a particular GPS satellite is tracked by generating and matching, or correlating, the PRN code for that particular satellite. All PRN codes are known and are generated or stored in GPS receivers used by ground observers. A first PRN code for each GPS satellite, sometimes referred to as a precision code or P(Y)-code, is a relatively long, fine-grained code having an associated clock or chip rate of $f0=10.23$ MHz. A second PRN code for each GPS satellite, sometimes referred to as a clear/acquisition code or C/A-code, is intended to facilitate rapid satellite signal acquisition and hand-over to the P(Y)-code, and is a relatively short, coarser-grained code having a clock or chip rate of $f0/10=1.023$ MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and P(Y)-code are set forth in the GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8 relative to the equator, and the three orbital planes are separated from each other by multiples of 120 longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k ($=0,1,2, \ldots 23$) is the satellite slot number. These frequencies lie in two bands at 1.597–1.617 GHz (L1) and 1,240–1,260 GHz (L2). The L1 code is BPSK modulated by a C/A- code (chip rate=0.511 MHz) and by a P(Y)-code (chip rate=5.11 MHz). The L2 code is presently BPSK modulated only by the P(Y)-code. The GLONASS satellites also transmit navigational data at a rate of 50 Baud. Because the GLONASS system has chosen the FDMA approach, there is no need for multiple P(Y) or C/A codes for different GLONASS satellites. The methods for receiving, processing, and utilizing the GLONASS signals are similar to the methods used for the GPS signals.

Reference to a Satellite Positioning System or SATPS herein refers to a Global Positioning System (GPS), to a Global Orbiting Navigation Satellite System (GLONASS), and to any other compatible satellite-based system that provides information by which an observer's position, velocity, and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-Centered-Earth-Fixed (ECEF) coordinate reference system utilized by the SATPS.

In the disclosed embodiment of the invention, the $GT_M$ has both a transmitter and receiver and is thus configured as a transceiver. In particular, $GT_M$ has an SATPS receiver including a SATPS antenna. The SATPS antenna of $GT_M$ receives positioning signals from the SATPS satellite 510 which are then rebroadcast by $GT_M$ as a master positioning signal. The clocks of the transceivers $GT_1, GT_2, \ldots GT_n$ are slaved to the master transceiver GTM clock signal, as in the case of System A.

The preferred embodiment of the present invention also includes a method employing the system (A) for accurate determination of the terrestrial position, timing coordinate, and velocity of a user or object in real-time by transmitting signals from well-known locations. The method comprise the following steps. First, an N-number of ground transmitters $GT_i$ and at least one master ground transmitter $GT_M$ for generating ground transmitter $L(GT_i)$ signals for providing ranging, timing, and velocity information at the user's location, are provided.

The method can further include a step of providing a synchronization signal to each $GT_i$ in order to synchronize clocks for all ground transmitters. This synchronization step can be performed by transmitting the synchronization signal from the ground transmitter $GT_M$.

The method can additionally include a step of initialization of each $GT_i$, that is, to provide the initial precise location coordinates and the ID for each ground transmitter.

The present embodiment also includes the method employing a system (B) for accurate determination of the terrestrial position, timing coordinate, and velocity of an autonomous vehicle in real-time by transmitting signals from well-known locations. This method is similar to the method employing the system (A), but includes the step of obtaining positioning signals from at least one satellite SATPS.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A system configured to determine a position of an object, comprising:
    at least one ground transmitter configured to generate ground transmitter position signals comprising position information, said at least one ground transmitter having a known position;
    at least one ground transceiver having a known position and configured to receive said ground transmitter position signals and transmit ground transceiver position signals that are synchronized to the clock of said at least one ground transmitter;
    said object configured to receive the ground transmitter position signals, the ground transceiver position signals, and calculate the position of the object based on said received signals and the known positions of said at least one ground transmitter and said at least one ground transceiver.

2. The system of claim 1, wherein the object calculates its position by calculating a difference range equation based on a first range equation and a second range equation, said first range equation being based on a range between said at least first transmitter and said object, said second range equation being based on a range between said at least first transceiver and said object.

3. The system of claim 1, wherein the position of the object includes ranging information of the object.

4. The system of claim 1, wherein the position of the object includes velocity information of the object.

5. The system of claim 1, wherein the position of the object includes a timing coordinate of the object.

6. The system of claim 1, wherein said ground transmitter receives position signals from at least one satellite to generate its known position.

7. The system of claim 1, wherein at least one ground transceiver comprising a first, second and third ground transceivers, each having a known location and configured to receive said ground transmitter position signals and transmit corresponding first, second and third ground transceiver position signals that are synchronized to the clock of said ground transmitter;
    wherein said object is further configured to calculate its position based on the ground transmitter position signals and the first, second, and third ground transceiver position signals and the known positions of said at least one ground transmitter and said first, second and third ground transceivers.

8. The system of claim 1, wherein the at least one ground transmitter further comprising a first, second and third ground transmitters each having known locations and configured to generate corresponding first, second and third ground transmitter position signals;
    wherein said object is further configured to calculate its position based on the first, second and third ground transmitter position signals and the at least one transceiver position signals and the known positions of said first, second and third ground transmitter and the at least one ground transceiver.

9. The system of claim 1, wherein the at least one ground transceiver further comprising a first, second and third ground transceivers each having known locations and configured to generate corresponding first, second and third ground transceiver position signals;
    wherein said object is further configured to calculate its position based on the first, second and third ground transceiver position signals and the at least one transmitter position signals and the known positions of said first, second and third ground transceiver and the at least one ground transmitter.

10. The system of claim 1, further comprising a base station having a known location and configured to calculate differential correction data signals based on said ground transmitter position signals and transmit the differential correction data signal to said object; and wherein said object is further configured to calculate its position based on the differential correction data signal, the ground transmitter position signals, the ground transceiver position signals and the known positions of the base station, at least one ground transmitter and at least one ground transceiver.

11. The system of claim 10, wherein said base station is further configured to calculate said differential correction data signals based on said ground transmitter position signals and said ground transceiver position signals.

12. A method for determining a position of an object, comprising:
    generating ground transmitter position signals from at least one ground transmitter having a known location;
    at least one ground transceiver generating corresponding ground transceiver position signals from ground transmitter position signals, said ground transceiver position signals being synchronized to the clock of said at least one ground transmitter;
    said object receiving the ground transmitter position signals and the ground transceiver position signals; and said object determining a position of said object based on the ground transceiver position signals, the ground transmitter position signals, the known position of the at least one ground transmitter and the known position of the at least one ground transceiver.

13. The method of claim 12, wherein determining a position of the object comprises calculating a difference range equation based on a first range equation and a second range equation, said first range equation being based on a range between said at least first transmitter and said object, said second range equation being based on a range between said at least first transceiver and said object.

14. The method of claim 12, wherein determining a position of said object comprises determining ranging information of said object.

15. The method of claim 12, wherein determining a position of said object comprises determining a velocity of said object.

16. The method of claim 12, wherein in determining a position of the object, said position is a timing coordinate of said object.

17. The method of claim 12, further comprising providing a synchronization signal to said ground transmitter.

18. The method of claim 12, further comprising initializing each said ground transmitter by providing location coordinates for said ground transmitter.

19. The method of claim 12, further comprising said ground transmitter calculating its known position based on said position signals received from satellites.

20. The method of claim 12, further comprising initializing each said ground transceiver by providing location coordinates for said ground transceiver.

21. The method of claim 12, wherein:

generating corresponding ground transceiver position signals generates first, second and third ground transceiver position signals from a first, second and third ground transceiver each having a known location and a clock synchronized to the clock of the ground transmitter;

said object receiving the first, second, and third ground transceiver position signal and determining its position based on said ground transmitter position signals, said first, second and third ground transceiver position signals, the known position of said at least one ground transmitter and the known positions of said first, second and third ground transceivers.

22. The method of claim 12, wherein:

generating ground transmitter position signals comprises generating first, second, and third ground transmitter position signals by a first, second and third ground transmitter, each having a known location; and said object receiving the first, second and third ground transmitter position signal and determining its position based on said ground transceiver position signals, said first, second and third ground transmitter position signals, the known position of said at least one ground transceiver and the known positions of said first, second and third ground transmitters.

23. The method of claim 12, further comprising:

receiving, by a base station, the ground transmitter position signals from said ground transmitter;

said base station calculating a differential correction data signals based upon the received ground transmitter position signals;

said object receiving said differential correction data signals from the base station; and said object determining a position is further based on the differential correction data signals.

24. The method of claim 23, further comprising:

transmitting, by said at least one ground transceiver, the ground transceiver position signals to said base station; said base station calculating said differential correction data signals based on said ground transmitter position signals and said ground transceiver position signals.

* * * * *